United States Patent [19]

Sakurai et al.

[11] Patent Number: 4,512,786
[45] Date of Patent: Apr. 23, 1985

[54] EXHAUST GAS PURIFYING DEVICE

[75] Inventors: Shigeru Sakurai; Shigeki Hamada, both of Hiroshima, Japan

[73] Assignee: Mazda Motor Corporation, Hiroshima, Japan

[21] Appl. No.: 486,819

[22] Filed: Apr. 20, 1983

[30] Foreign Application Priority Data

Apr. 21, 1982 [JP] Japan ............................. 57-58746[U]
Apr. 24, 1982 [JP] Japan ............................. 57-60148[U]

[51] Int. Cl.³ ...................... B01D 39/20; B01D 46/24; B01D 46/42
[52] U.S. Cl. ......................................... 55/282; 55/466; 55/DIG. 10; 55/DIG. 30; 55/523; 60/303; 60/311; 422/178
[58] Field of Search ................. 55/208, 282, 466, 523, 55/DIG. 10, DIG. 30; 422/174, 178, 199; 60/295, 296, 300, 303, 311

[56] References Cited

U.S. PATENT DOCUMENTS

| 4,040,253 | 8/1977 | Dhugues et al. | 422/174 |
| 4,283,207 | 8/1981 | Martyniuk | 55/523 |
| 4,299,600 | 11/1981 | Kobashi | 55/213 |
| 4,346,557 | 8/1982 | Shadman et al. | 60/311 |
| 4,373,330 | 2/1983 | Stark | 55/466 |
| 4,390,355 | 6/1983 | Hammond, Jr. et al. | 55/523 |
| 4,415,344 | 11/1983 | Frost et al. | 55/523 |
| 4,417,908 | 11/1983 | Pitcher, Jr. | 55/523 |

FOREIGN PATENT DOCUMENTS 131518 10/1980 Japan .
148607 11/1981 Japan .

Primary Examiner—David L. Lacey
Attorney, Agent, or Firm—Burns, Doane, Swecker & Mathis

[57] ABSTRACT

An exhaust gas purifying device for use with a diesel engine comprising a filter block disposed in an engine exhaust passage for collecting exhaust gas particulates, and a heater for incinerating the collected exhaust gas particulates. The filter block has parallel channels defined therein and separated from one another by porous partition walls, some of the channels being closed at their inlet ends with blind plugs while the other channels are closed at their outlet ends with blind plugs. The heater is supported by the blind plugs.

3 Claims, 8 Drawing Figures

EXHAUST GAS PURIFYING DEVICE

BACKGROUND OF THE INVENTION

This invention generally relates to a device for substantially purifying exhaust gases emitted from an internal combustion engine and, more particularly, to a filter having a fixture supporting heating wires for incinerating exhaust gas particulates trapped in the filter.

As is well known to those skilled in the art, exhaust gases emitted from a diesel engine contain a relatively large amount of fine particulates mainly composed of carbon particulates. For minimizing the emission of such exhaust gas particulates, various purifying devices have been devised.

A simple form of the prior art purifying device is the use of a filter member made of wire meshes or refractory fibers and disposed in an engine exhaust system for trapping the exhaust gas particulates before they are discharged to the atmosphere.

Another type of the prior art devices comprises a filter block made of ceramic material such as cordierite and having a plurality of axially extending parallel channels which are separated from each other by porous partition walls, some of the channels being closed at their inlet ends with blind plugs while the remaining channels are closed at their outlet ends with similar blind plugs. This type is disclosed in, for example, the Japanese Laid-open Patent Publication No. 56-148607, published Nov. 18, 1981, and the U.S. Pat. No. 4,346,557, issued Aug. 31, 1982, and when in use as disposed in an engine exhaust system, operates so as to trap the exhaust gas particulates as the exhaust gases from the engine flow through the filter block in a direction from the unclosed inlet ends of some of the channels to the unclosed outlet ends of the remaining channels across the porous partition walls. However, it has been found that there is a problem in that the filter block tends to be clogged with the exhaust gas particulates as a result of the pile-up of the particulates, when the purifying device is used for a substantial period of time, to such an extent as to result in the increased exhaust gas pressure with the consequent reduction in engine power output.

In view of the above, the use of heating wires such as nichrome wires has been contemplated, as disclosed in, for example, the Japanese Laid-open Patent Publication No. 55-131518, published Oct. 13, 1980, to clean or regenerate the filter by incineration of the exhaust gas particulates trapped in the filter. According to this prior art, the heating wires are bonded to the filter by the use of refractory bonding material and are adapted to be electrically energized to emit heat necessary to ignite the trapped exhaust gas particulates each time the filter has been clogged.

However, according to the prior art disclosed in the Japanese Laid-open Patent Publication No. 55-131518, since the heating wires are bonded to one end face of the filter block by the use of the bonding material, as described above, not only is the use of the bonding material required, but also the heating wires once bonded to the filter block tend to separate readily therefrom, and difficulty is also encountered in firmly fixing the heating wires.

In addition, when the manner in which the exhaust gas particulates pile up in the filter is taken into consideration, it is generally recognized that the exhaust gas particulates entering each channel form a layer adhering to the interior surface of the surrounding partition wall with its thickness maximized at a location slightly inwardly from the inlet end and gradually decreasing towards the outlet end. Therefore, since the device such as disclosed in the last mentioned publication is such that the heating wires are positioned on the downstream side of the filter block with respect to the direction of flow of the exhaust gases from the engine towards the atmosphere across the purifying device, the filter can not be efficiently regenerated.

SUMMARY OF THE INVENTION

Accordingly, this invention has been developed with a view to substantially eliminating the above described disadvantages and inconveniences inherent in the prior art purifying devices and has for its essential object to provide an improved purifying device effective to minimize the emission of the exhaust gas particulates at improved efficiency without substantially inviting the increase in exhaust gas pressure which would otherwise result in the reduced engine power output.

Another important object of this invention is to provide an improved purifying device of the type referred to above, which can be efficiently regenerated by incineration of the exhaust gas particulates trapped in the filter block.

A further object of this invention is to provide an improved purifying device of the type referred to above, wherein heating wires used to ignite the trapped exhaust gas particulates can be readily and firmly fixed to the filter block without requiring extra parts designed solely for this purpose.

In order to accomplish these objects of this invention, there is provided an exhaust gas purifying device which comprises a filter body or monolith of porous refractory material with the parallel closely adjacent channels defined therein and separated from one another by the porous partition walls. The channels have their respective inlet ends for the introduction of exhaust gases thereinto and their respective outlet ends opposite to the inlet ends for the discharge of the exhaust gases therefrom. The inlet ends of some of the channels are choked or closed with blind plugs. The purifying device also comprises at least one continuous heating wire having its opposite ends drawn out of the purifying device and electrically connected to a source of electric power through a control circuit, a substantially intermediate portion of said heating wire being supported at plural locations by some of the blind plugs used to close the inlet ends of the channels. Preferably, at each location where the heating wire is supported by the corresponding blind plug, the heating wire extends a predetermined distance into the channel completely through the corresponding blind plug and, after having been turned backwards to assume a generally U-shaped configuration, extends out of such channel completely through corresponding blind plug. Therefore, when the heating wire is electrically energized, heat emitted therefrom can spread over a relatively large region of the filter monolith while being concentrated in a portion of the channel adjacent the plugged inlet end thereof which conform to the location where the exhaust gas particulates tend to pile up to the maximum thickness. By this reason, incineration of the piled exhaust gas particulates can be readily and efficiently carried out to regenerate the filter monolith. In addition, since the U-shaped portions of the heating wire so supported by the blind plugs are located in some of the channels the heating wire can be firmly secured relative to the filter monolith.

It is, however, to be noted that, where the channels are closed alternately at their inlet and outlet end with the blind plugs positioned every other channel in all directions such as disclosed in the previously mentioned Japanese Laid-open Patent Publication No. 56-148607, and if the heating wire is fixed at plural locations to all of the blind plugs, the result would be not only the increased consumption of the electric power, but also the increased manufacturing cost. In the design wherein, in order to minimize the heating wire, one blind plug is used for every other channel or every two channels to fixedly support the heating wire, the heating efficiency of the heating wire tends to be reduced because the channels having their inlet ends closed with the blind plugs adjoin or come around the blind plugs.

Experiments have shown that, with the filter block wherein both the inlet ends and the outlet ends are alternately closed with the blind plugs one for every other channels in all direction such that about 50% of the total number of the channels is closed on each end of the filter block, the exhaust gas pressure increases proportionally as the exhaust gas particulates are trapped, as shown by the curve a in the graph of FIG. 8, which pressure attains the maximum value at the time the filter block has been clogged with the particulates. Therefore, according to the prior art, the purifying device has to be regenerated periodically at relatively short intervals in order for the increase of the exhaust gas pressure to be suppressed.

In accordance with this invention, the above described problems can advantageously be eliminated substantially by positioning the blind plugs in such a way that each plugged inlet end of the respective channel can be surrounded by the unclosed inlet ends of the channels, that is, the channels having their outlet ends closed with the blind plugs, so that about 75% of the total number of the channels can be left unclosed on the upstream end of the filter monolith. With this arrangement of the blind plugs relative to the filter monolith, not only can the previously described advantages be appreciated, but additional advantages can also be appreciated in that the increase of the exhaust gas pressure can be suppressed as shown by the curve b in the graph of FIG. 8 and that the number of the heating wires to be used can be minimized.

BRIEF DESCRIPTION OF THE DRAWINGS

These and objects and advantages of this invention will readily become apparent to those skilled in the art upon reading of the following detailed description made in connection with a preferred embodiment thereof with reference to the accompanying drawings, in which.

DETAILED DESCRIPTION OF THE EMBODIMENT

Figure 1:
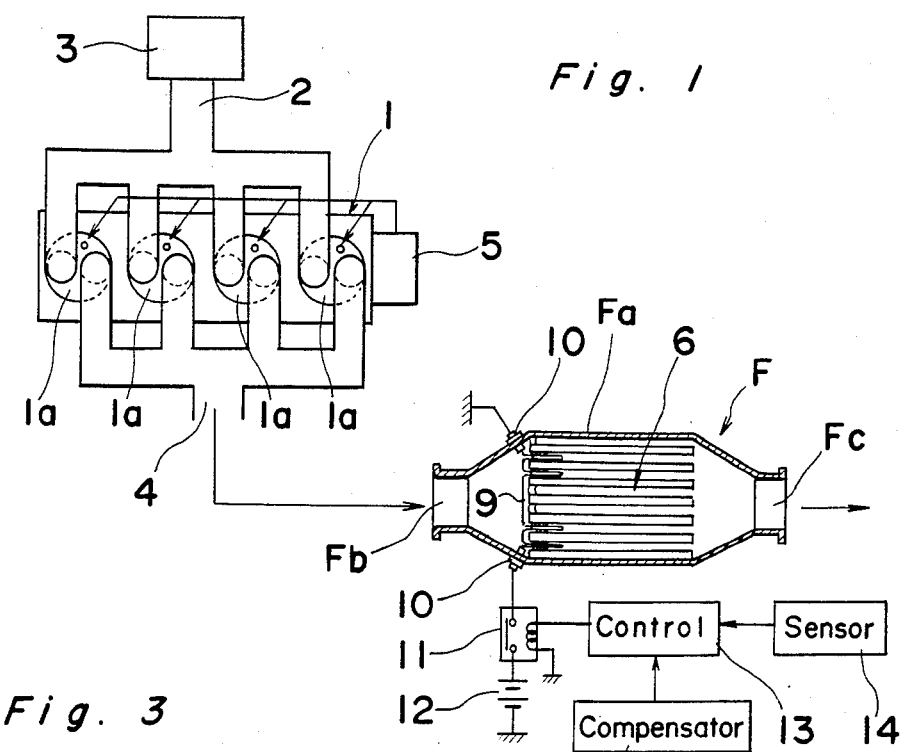
FIG. 1 is a diagram showing an automobile power plant with an exhaust gas purifying device according to this invention shown in longitudinal sectional view.

Before the description of the embodiment of this invention proceeds, it is to be noted that like parts are designated by like reference numerals throughout the several views of the accompanying drawings.

Referring first to FIG. 1, there is schematically shown a four-cylinder diesel engine 1 having four cylinders 1a communicating through an air intake passage 2 and then through an air cleaner 3 to the atmosphere on the one hand and to the atmosphere through an exhaust passage 4 on the other hand, and a fuel supply pump 5 for injecting fuel oil into the cylinders 1a through respective injection nozzles in a predetermined sequence known to those skilled in the art. The exhaust passage 4 has a filter unit F for collecting particulates, mainly carbonaceous in nature, in the exhaust gases delivered thereto from the engine 1, and having a capability of being cleaned by incineration of the particulates so collected.

The filter unit F comprises a housing Fa of any suitable material known to those skilled in the art, which housing Fa has inflow and outflow openings Fb and Fc communicated respectively to the engine cylinders 1a and the atmosphere. Within the housing Fa, there is fixedly disposed a filter monolith 6 made of any known porous refractory material, for example, a gas-permeable ceramics, with the parallel closely adjacent channels 6b defined therein in a direction longitudinally thereof and separated from one another by the porous partition walls 6a. It is to be noted that the pores in the partition walls 6a are so open-celled as to permit gas flowing in one channel 6b to permeate into the circumferentially surrounding channels 6b through the associated partition walls 6a. The filter monolith 6 of the construction described above is fixedly supported in the housing Fa with the channels 6b axially aligned with any one of the inflow and outflow openings Fb and Fc. With the filter monolith 6 so supported, the channels 6b have their inlet and outlet ends facing the inflow and outflow openings Fb and Fc in the housing Fa, respectively.

Figure 7:
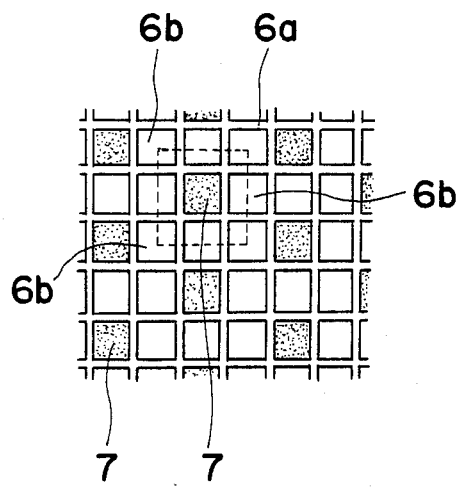
FIG. 7 is a view similar to FIG. 6, but on an enlarged scale, showing the details of one blind plug relative to the other blind plug.
Figure 8:
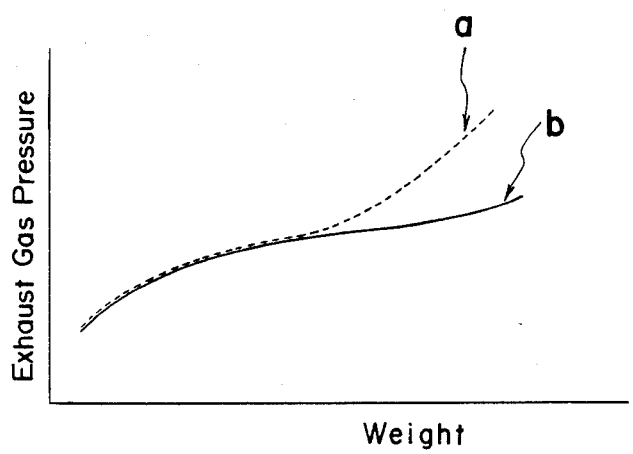
FIG. 8 is a graph showing the difference in performance of the prior art purifying device and that of this invention.

In accordance with this invention, as best shown in FIGS. 2, 3, 6 and 7, some of the channels 6b are choked or closed with respective blind plugs 7 plugged a predetermined distance into their inlet ends, and the other of the channels 6b are also choked or closed with respective blind plugs 8 plugged a predetermined distance into their outlet ends. More specifically, the blind plugs 7 are so plugged into the inlet ends of some of the channels 6b that each of the inlet ends of such some of the channels with the respective blind plug 7 therein can be circumferentially surrounded by the inlet ends of the other of the channels 6b while the blind plugs 8 plugged into the outlet ends of such other of the channels 6b are distributed in a pattern opposite to the pattern of distribution of the blind plugs 7. Before this invention is described further, it is to be noted that some of the channels 6b with the inlet ends choked or closed by the blind plugs 7 and the other of the channels with the outlet ends choked or closed by the blind plugs 8 are hereinafter referred to as "inlet-plugged channels" and "outlet-plugged channels", respectively, for the sake of brevity. Therefore, it will readily be seen that, for each inlet-plugged channel, eight outlet-plugged channels adjacently surround and extend closely exteriorly of the inlet-plugged channel as best shown in FIG. 7.

Each of the blind plugs 7 and 8 may be made of the same ceramic material as the filter monolith 6 or any other suitable refractory cement.

In the construction so far described, it will readily be seen that, as the exhaust gases delivered from the engine 1 to the filter unit F flow through the filter monolith 6 towards the atmosphere, the exhaust gases first enter the inlet ends of the outlet-plugged channel 6b, then permeate into the neighbouring inlet-plugged channels 6b through the partition walls 6a with the exhaust gas particulates trapped in the outlet-plugged channels, and finally emerge from the outlet ends of the inlet-plugged channels in the form of substantially purified exhaust gases. As a matter of course, the exhaust gas particulates trapped by the filter monolith 6 pile up in each of the outlet-plugged channels, forming a layer adhering to the peripheral surface of each of the partition walls 6a confronting the respective outlet-plugged channel. The thickness of the layer of the exhaust gas particulates having piled up in the manner described above is generally maximized at a location a slight distance inwardly from the inlet end of each outlet-plugged channel and gradually decreases towards the outlet end thereof, substantially resembling in longitudinal cross section the shape of a venturi in an automobile carburetor.

Figure 3:
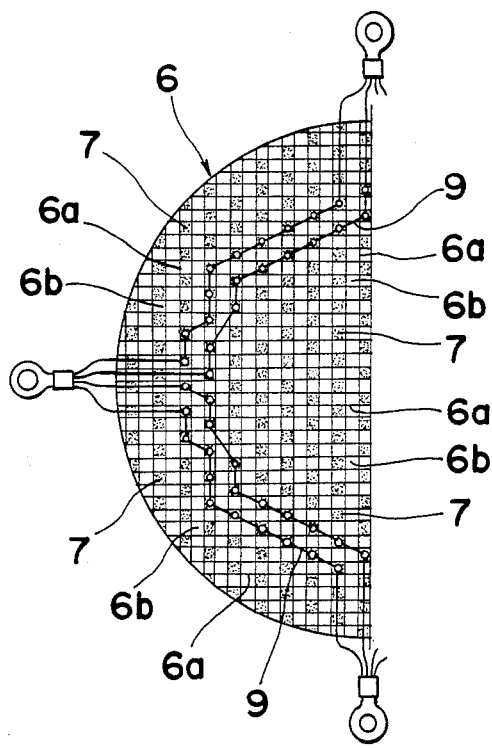
FIG. 3 is a front elevational view of a half of a filter monolith used in the purifying device.
Figure 4:
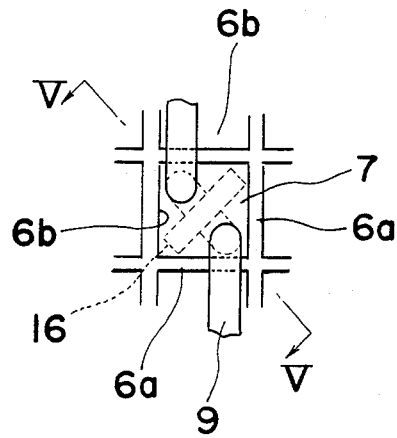
FIG. 4 is a front elevational view, on a further enlarged scale, showing an inlet end of one of the channels in the filter monolith.
Figure 2:
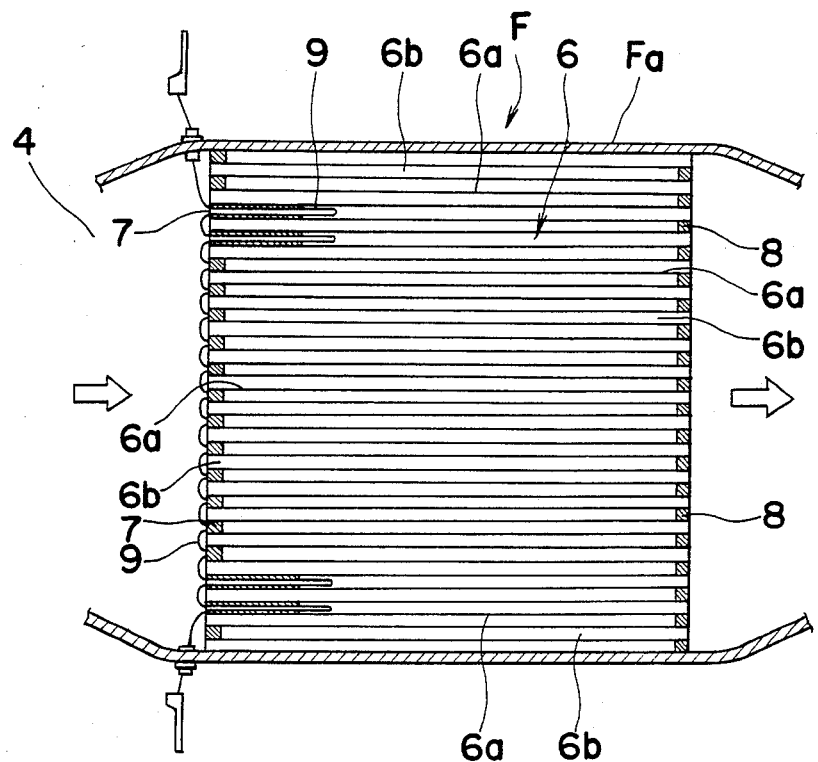
FIG. 2 is a longitudinal sectional view, on an enlarged scale, of a portion of the purifying device.
Figure 5:
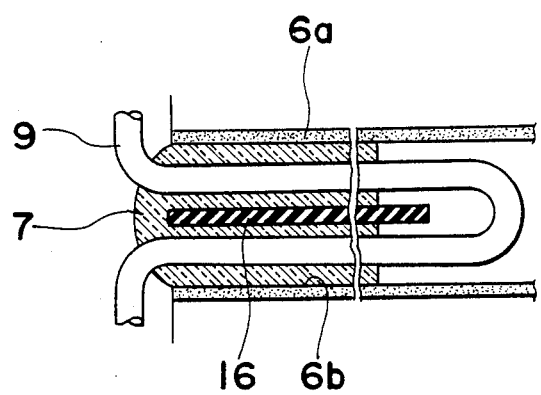
FIG. 5 is a cross-sectional view taken along the line V—V in FIG. 4.
Figure 6:
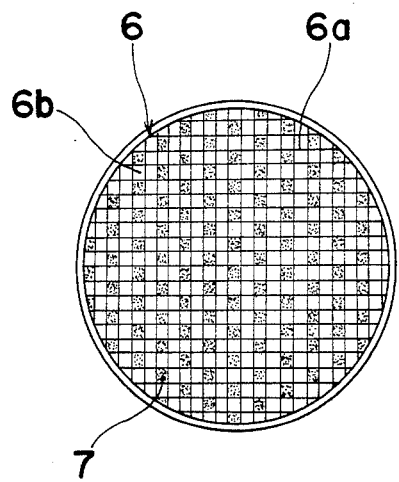
FIG. 6 is a front elevational view of the filter monolith, showing the pattern of distribution of blind plugs.

For the purpose as will subsequently be described, some of the blind plugs 7 in the inlet-plugged channels 6b protrude into the respective inlet ends of the channels a distance greater than that through which the remaining blind plugs 7 protrude into the respective inlet ends of the channels, as best shown in FIG. 2. In other words, some of the blind plugs 7, which will be hereinafter termed longer plugs, have a length greater than that of the remaining blind plugs 7 which will be hereinafter termed "shorter plugs". As shown in FIGS. 2, 3 and 5, the longer plugs 7 fixedly support continuous heating wires 9, for example, continuous nichrome wires, each having a portion bent to extend into the associated inlet-plugged channel 6b through the associated longer plug 7 and then turned backwards to extend exteriorly from such associated inlet-plugged channel through such associated longer plug as best shown in FIG. 5.

The opposite end portions of each of the continuous heating wires 9 are, as best shown in FIG. 1, drawn out of the filter monolith 6 and connected to terminal members 10 rigidly mounted on the housing Fa in electrically insulated relation, said terminal members 10 being in turn connected to the ground potential and to a source 12 of electric power, for example, an automobile power battery, through a relay 11, respectively. Electrically connected to the relay 11 is a control unit 13 adapted to receive an output signal fed from a sensor 14 and also an output signal, or a correction signal, fed from a compensator 15. The sensor 14 is so designed as to detect, and generate the output signal indicative of, the mileage of the automobile, the operating hour of the engine (for example, the time during which the key switch is turned on), the fuel consumption, the clogging condition of the filter monolith 6 (for example, the increase in backpressure or reduction in resistance as a result of the pile-up of carbon particulates) and other parameters. On the other hand, the compensator 15 is so designed as to detect, and generate the correction signal indicative of, the temperature of the engine exhaust gases, the magnitude of load, the engine speed and others.

The electric circuit shown in FIG. 1 is so designed as to operate in such a manner that, when the mileage, the engine operating hour or the clogging condition has attained a predetermined value or condition, the control unit 13 can be operated in response to the respective signals from the sensor 14 and the compensator 15 to control the selective switching on and off of the relay 11 thereby to initiate and interrupt, respectively, the supply of the electric power through the heating wires 9. It is, however, to be noted that, where the supply of the electricity through the heating wires 9 is regularly effected by the detection of, for example, the mileage or the engine operating hour, the compensator 15 can cancel the accumulated mileage or the engine operating hour during a high load operating condition wherein the temperature of the exhaust gases is apt to be higher than that at which spontaneous combustion takes place, and that, where the clogging condition is detected in terms of the increase in pressure of the exhaust gases, the compensator 15 can compensate for variation of the exhaust gas pressure resulting from change in engine operating condition, and that, where the clogging condition is detected in terms of change in electrical resistance resulting from the pile-up of the carbon particulates, the compensator 15 can compensate for change in resistance resulting from change in temperature.

Each of the longer plugs 7 supporting the respective portions of the heating wires 9 has an insulator piece 16 provided therein for avoiding any possible shortcircuiting of the parallely extending portions of the respective wire 9 in the longer plug 7.

The exhaust gas purifying device of the construction described above operates in the following manner.

After the use of the purifying device for a substantial period of time, it will be found that the filter monolith 6 may be clogged with exhaust gas particulates. At this time, the sensor 14 detects the clogging condition of the filter monolith 6 and applies the output signal to the control unit 13. Then, the control unit 13 is operated by the output signal from the sensor 14 on the basis of the correction signal from the compensator 15 to activate the relay 11. When the relay 11 is so activated, the heating wires 9 are electrically energized to emit heat with which the exhaust gas particulates piled up in the filter monolith 6 are incinerated. As a result thereof, the filter monolith 6 is cleaned by incineration of the exhaust gas particulates. In this way, the filter monolith 6 which has once been clogged with the exhaust gas particulates can be regenerated.

It is to be noted that, since the portions of each of the heating wires 9 extend deep into the respective inlet-plugged channels while fixedly supported by the longer plugs 7, the region of the filter monolith 6 in which the incineration takes place extends from the upstream end to the downstream end of the filter monolith 6, conforming to the area where the exhaust gas particulates pile up as trapped by the filter monolith 6. Therefore, by the effect of concentrated heating of the exhaust gas particulates so trapped in the filter monolith, the filter monolith 6 can be regenerated at increased efficiency.

In addition, since some of the blind plugs 7 used to close the inlet ends of some of the channels 6b are concurrently used to support the heating wires 9 as hereinbefore described, the fixture of the heating wires 9 to the filter monolith 6 can readily be achieved without extra fixing elements required.

So far shown and described, each of the heating wires 9 is fixedly supported by the longer plugs 7 with its portion extending interiorly into the associated channel 6b through the associated longer plug 7 and then exteriorly from such associated channel 6b through the same longer plug 7 after having been turned backwards to assume a generally U-shaped configuration inside the inlet-plugged channel 6b. However, an alternative method can be contemplated to make the heating wires 9 embedded in the longer plugs 7 or to place the heating wires 9 frontwardly of the filter monolith 6 with respect to the direction of the exhaust gas flow.

Moreover, since the blind plugs 7 are so distributed and so positioned to the inlet ends of the channels 6b that each of the inlet-plugged channels can be circumferentially surrounded by the inlet ends of the outlet-plugged channels, the number of the openings leading into the channels as a whole is greater at the upstream end of the filter monolith 6 than at the opposite, downstream end thereof. Specifically, substantially 75% of the inlet ends of the outlet-plugged channels 6b is left open, i.e., unclosed with the blind plugs 7, at the upstream end of the filter monolith 6. Therefore, even if the partition walls 6a in the filter monolith 6 are clogged with the exhaust gas particulates, the resistance to the flow of the exhaust gases therethrough is minimized and, accordingly, the increase of the exhaust gas pressure which tends to occur when the clogging takes place can be minimized. Since as a result thereof the filter monolith 6 need not be readily regenerated to suppress the increase of the exhaust gas pressure, the consumption of electric power by the heating wires 9 can advantageously be minimized. Therefore, the number of the heating wires 9 used in the device of this invention can be minimized as they are fixedly supported by the blind plugs 7 used to close about 25% of the total number of the inlet ends of the respective channels 6b in the filter monolith.

Furthermore, since each adjacent two longer plugs 7 supporting the heating wires 9 are spaced from each other a distance equal to or greater than the bore size of each channel 6b, heat from that portion of each heating wire 9 which is situated within the corresponding channel 6b can spread to a region shown by the chain line in FIG. 7, covering the circumferentially surrounding outlet-plugged channels 6b, with the result that the partition walls 6a confronting such surrounding channels can also be heated with no substantial loss of the heating efficiency.

It is to be noted that, for the purpose of reducing the thermal load resulting from the passage of the electric power, the heating wires 9 supported by the longer plugs 7 are preferably so arranged as to extend in generally concentric circles adjacent an outer peripheral region of the filter monolith 6 substantially as shown in FIG. 3. This is because heat confined in a center region of the filter monolith 6 does not readily escape therefrom and the center region of the filter monolith 6 heated by the high temperature exhaust gases has an internal compressive stress set up therein and because the outer peripheral region of the filter monolith has a lower temperature than that of the center region thereof due to the heat ready to escape therefrom and therefore has an internal tensile stress set up therein.

From the foregoing full description of the embodiment of this invention, it has now become clear that, because the channels in the filter monolith are closed alternately at their inlet ends and outlet ends by the use of the blind plugs and some of the blind plugs used to close the inlet ends of the respective channels are utilized to support the heating wires necessary to effect incineration of exhaust gas particulates trapped in the filter monolith, the filter monolith used in the device of this invention can readily be regenerated at relatively high efficiency with the minimized electric power consumption. It is also clear that, since the heating wires supported by some of the blind plugs in the inlet ends of some of the channels extend partly into some of the channels, the filter monolith can be heated over a relatively large region to facilitate efficient incineration of the trapped exhaust gas particulates.

The fact that about 75% of the total number of the inlet ends of the respective channels is left unclosed is effective to suppress the increase of the exhaust gas pressure upstream of the filter unit.

Although this invention has fully described in connection with the preferred embodiment thereof with reference to the accompanying drawings, it is to be noted that various changes and modifications can readily be conceived by those skilled in the art without departing from the scope of this invention as defined by the appended claims. Such changes and modifications are to be understood as included within the scope of this invention.

We claim:

1. An exhaust gas purifying device comprising a housing having an inlet end, an outlet end and a generally elongated filter block disposed therebetween for use with a diesel engine having an exhaust passage for the discharge of exhaust gases from the engine to the atmosphere;
   wherein said filter block has parallel channels defined therein so as to extend in a direction longitudinally of the filter block, said parallel channels being separated from one another by gas-permeable partition walls and having respective inlet ends for the introduction of exhaust gases thereinto and outlet ends for the discharge of exhaust gases therefrom;
   a plurality of first blind plugs provided separate from the filter block and closing the inlet ends of some of the channels;
   a plurality of second blind plugs closing the outlet ends of the other channels; and
   an electric heating means comprised of at least one continuous heating wire having a plurality of generally U-shaped wire portions which are electrically connected in series with each other, said U-shaped wire portions being inserted into the inlet ends of said some of the channels and supported by the respective first blind plugs, said U-shaped wire portions, when the heating wire is electrically energized, incinerating the exhaust gas particulates collected in the filter block.

2. A device as claimed in claim 1, wherein each inlet end of said some of the channels which is closed with the respective first blind plug is circumferentially surrounded by the inlet ends of the other channels.

3. A device as claimed in claim 1, wherein said heating means is supported at a location adjacent to the outer perimeter of the filter block.

* * * * *